United States Patent Office 3,803,086
Patented Apr. 9, 1974

3,803,086
VINYL-SUBSTITUTED SILOXANE AND SILOXAZANE POLYMERS
Laurence W. Breed, Overland Park, Kans., and James C. Wiley, Jr., Blue Springs, Mo., assignors to the United States of America as represented by the Secretary of the Air Force
No Drawing. Filed Feb. 5, 1973, Ser. No. 329,509
Int. Cl. C08f 11/04
U.S. Cl. 260—46.5 E
14 Claims

ABSTRACT OF THE DISCLOSURE

Polymer compositions are prepared by the polycondensation of an arylenedisilanol, a cyclic siloxazane compound or an N,N'-aminosilyl derivative thereof, and a vinyl-substituted arylenedisilanol. The polymer products are elastomeric and can be readily cured with conventional peroxide curing agents. Furthermore, the rubbery polymers exhibit a high degree of thermal stability and possess outstanding physical properties. The products can be formed into films, thereby rendering them particularly useful as protective coatings.

FIELD OF THE INVENTION

This invention relates to siloxane and siloxazane polymers which contain vinyl groups. In one aspect, it relates to thermally stable siloxane and siloxazane polymers which are readily vulcanized with conventional peroxide curing agents.

BACKGROUND OF THE INVENTION

In U.S. Pat. No. 3,444,126, L. W. Breed, a coinventor herein, and R. L. Elliott disclose poly(arylenesiloxane) polymers. L. W. Breed et al. also disclose in U.S. Pat. No. 3,702,317 poly(arylenesiloxazane) polymers. The products described in these two patents are elastomers which are stable at elevated temperatures. Although the polymers prepared by the methods of the patents possess desirable properties, in many instances curing of the materials with organic peroxides has not proven to be entirely satisfactory.

It is an object of this invention, therefore, to provide modified siloxane and siloxazane polymers which can be satisfactorily cured with organic peroxides.

Another object of the invention is to provide a method for preparing siloxane and siloxazane polymers which can be readily cured with peroxide curing agents.

A further object of the invention is to provide modified siloxane and siloxazane polymers which are stable at elevated temperatures and possess outstanding physical properties.

Other objects and advantages of the invention will become apparent to those skilled in the art upon consideration of the accompanying disclosure.

SUMMARY OF THE INVENTION

Broadly speaking, the present invention resides in a method for modifying siloxane and siloxazane polymers by introducing vinyl groups into the backbone of the polymers. The presence of the vinyl groups provides cross-linking sites, which are not present in the unmodified polymers, thereby facilitating curing of the polymer products. The method comprises the step of reacting a disilanol having the formula:

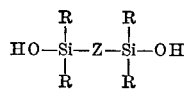

(I)

with a silicon compound selected from the group of compounds having the following formulae:

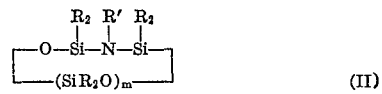

(II)

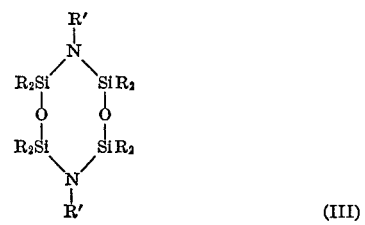

(III)

and

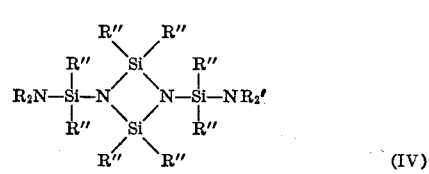

(IV)

in the presence of a compound having the following formula:

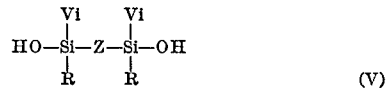

(V)

wherein Z is an arylene group, R is a monovalent hydrocarbon radical, m is 1 or 2, R' is hydrogen or an alkyl radical, R" is individually selected from the group consisting of alkyl radicals and aromatic radicals having 6 carbon atoms in the aromatic ring, and Vi is vinyl.

In the foregoing formulae, the arylene group designated by Z can be m-phenylene, p-phenylene, diphenylene, or a group consisting of two phenylene radicals linked by one or more heteroatoms such as oxygen. The monovalent hydrocarbon radicals represented by R can be alkyl groups such as methyl, ethyl and propyl; aryl groups such as phenyl and naphthyl; alkaryl groups such as tolyl and xylyl; aralkyl groups such as benzyl and phenylethyl; and cycloalkyl groups such as cyclopentyl and cyclohexyl; and the like. It is to be understood that more than one of the foregoing groups can be present in the same compound, e.g., a methyl and a phenyl group can be attached to the silicon atoms adjacent the arylene groups. As indicated above, R' is a hydrogen atom or an alkyl group, e.g., methyl, ethyl, or the like. The hydrocarbon groups represented by R" can be the same or different and include alkyl groups such as methyl, ethyl and propyl; aryl groups such as phenyl; and cycloalkyl groups such as cyclohexyl. Furthermore, the groups designated as R" can be substituted with atoms such as fluorine, chlorine and bromine and groups such as methyl, ethyl and propyl. However, it is generally preferred that each R" group be an unsubstituted methyl group.

Examples of disilanols corresponding to Formula I include p-phenylenebis(dimethylsilanol), m-phenylenebis(dimethylsilanol), p-phenylenebis(methylphenylsilanol), m-phenylenebis(methylphenylsilanol), p - phenylenebis(diphenylsilanol), oxydi-p-phenylenebis(dimethylsilanol). The disilanols can be prepared by the hydrolysis of a suitable starting material, such as p-phenylenebis(ethoxydimethylsilane) according to the procedure described by L. W. Breed et al. in the Journal of Organometallic Chemistry, 9, 188 (1967) or by other well known methods.

Examples of cyclic siloxazanes corresponding to Formulae II and III include decamethyl-1,5-diaza-3,7-dioxa-2,4,6,8-tetrasilacyclooctane; heptamethyl-1-aza-3,5-dioxa-2,4,6 - trisilacyclohexane; nonamethyl-1-aza-3,5,7-trioxa- 2,4,6,8-tetrasilacyclooctane; and the like. The cyclic siloxazanes can be prepared by the reaction of $\alpha,\omega$-dichlorosiloxanes with an amine in a solvent such as petroleum ether. At low temperatures such as $-30°$ C., this reaction produces linear bis(methylamino)siloxazanes but at higher temperatures, such as 50° C., the desired N-methylsiloxazanes are produced in a high yield. At intermediate temperatures, such as 5 to 10° C., $\alpha,\omega$-bis(methylamino)siloxazanes are obtained, and the latter compounds can be condensed to N-methylsiloxazanes by heating in the presence of ammonium sulfate at 150 to 190° C.

Examples of N,N'-aminosilyl derivatives of a cyclodisilizane corresponding to Formula IV include N,N'-bis[(dimethylamino)dimethylsilyl]tetramethylcyclodisilizane;

N,N'-bis[(diethylamino)dimethylsilyl]tetramethylcyclodisilizane;

N,N'-bis[(dimethylamino)methylphenylsilyl]-2,4-dimethyl-2,4-diphenylcyclodisilizane;

and the like. The aminosilylcyclodisilazanes can be prepared by the aminolysis of a suitable starting material, e.g., by the treatment of N,N'-bis(chlorodimethylsilyl)tetramethylcyclodisilizane with dimethylamine in the manner described by L. W. Breed et al. in the Journal of Organometallic Chemistry 24, 315 (1970) or by other known procedures.

Examples of vinyl-substituted arylenedisilanols corresponding to Formula V include p-phenylenebis(methylvinylsilanol); oxydi-p-phenylenebis(methylvinylsilanol); and the like. The compound can be prepared by the procedure described by L. W. Breed et al. in the Journal of Organometallic Chemistry 9, 188 (1967). According to the procedure disclosed a difunctional aromatic Grignard reagent is condensed with diethoxymethylvinylsilane in order to obtain an arylene bis(ethoxymethylvinylsilane) intermediate. The intermediate can then be hydrolyzed to a vinyl-substituted silanol.

In the preparation of the polymers of this invention, a mixture of the siloxazane or the cyclodisilazane, the disilanol and the vinyl-substituted disilanol is heated at a temperature and for a period of time sufficient to effect the desired polymerization. The polymerization temperature generally falls in the range of about 20 to 200° C., preferably in the range of 140 to 180° C. The reaction period usually ranges from about 2 to 10 hours or until the polymer has a desired inherent viscosity which usually ranges from about 0.30 to 3.0 dl./g. as determined in toluene at 30° C. at a concentration of 0.5 percent. Stoichiometric amounts of the siloxazane or the cyclodisilazane and the disilanol can be utilized, but it is preferred to use a small excess, e.g., 5 to 10 percent of the stoichiometric amount, of the siloxazane or the cyclodilozane to compensate for any loss of this ingredient by volatilization. The amount of vinyl-substituted disilanol included in the reaction mixture falls in the range of about 1 to 50 mol percent, preferably 1 to 10 mol percent, of the disilanol content. Although it is not a necessary ingredient, it is often desirable to include an oxidation inhibitor, such as phenothiazine, in the reaction mixture. Its presence permits higher polymerization temperatures to be employed, thereby making it possible to obtain higher molecular weight polymers. The amount of the oxidation inhibitor used usually falls in the range of 0.05 to 0.2 weight percent of the total reaction mixture.

The polymerization reaction is preferably carried out in the absence of a solvent. However, it is within the scope of the invention to employ as a reaction medium an organic solvent such as toluene or xylenes. When the polymerization is conducted in the absence of a solvent, the polymer is purified by dissolving it in a solvent, such as toluene, and then filtering the solution to remove any insoluble portion. The solution is then preferably stirred with portions of water until the water phases subsequently separated from the solution are neutral. The solvent is then evaporated, thereby obtaining a purified polymer product.

When the polymerization is conducted in an organic solvent, at the end of the reaction period the solution obtained is filtered to remove any insolubles Thereafter, the solution is washed and the purified polymer product is recovered as described above.

When conducting the polymerization in the presence of a solvent, particularly when a compound according to Formula IV is one of the monomers, it is often desirable to interrupt the heating of the reaction mixture after partial polymerization and treating the reaction mixture with a silylating agent. A silylating agent is a compound capable of converting silanol groups to siloxane groups. As a result of this treatment, crosslinking of the polymer upon storage or further heating is prevented. Examples of silylating agents include bis(trimethylsilyl)acetamide and hexamethyldisilazane. The concentration of the silylating agent can vary within a rather broad range with a typical concentration being 20 milliliters of a 0.01 g./ml. solution of the agent for a polymer prepared from 0.02 mole of each of the monomers represented by Formulae I and IV.

The presence of the vinyl groups in the polymers of this invention improves their curability with conventional peroxide catalysts. Also, it has been found that some polymers prepared by the condensation of an arylenedisilanol with a cyclic siloxazane cannot be satisfactorily cured with an organic peroxide. By conducting the polymerization of such monomers in the presence of a vinyl-substituted disilanol, a polymer is obtained that can be readily cured with a peroxide curing agent. Examples of organic peroxides that can be used include tert-butyl peroxybenzoate, dicumyl peroxide, di-tert-butyl peroxide, benzoyl peroxide, and the like. The amount of the peroxide used in the curing generally falls in the range of about 0.75 to 3.0, preferably 1.5 to 2.0, parts by weight per 100 parts by weight of the polymer. Reinforcing agents, particularly silica, are included in the compounding recipe in an amount ranging from about 5 to 70 parts by weight per 100 parts by weight of the polymer. Although not an essential component of the recipe, a ferric oxide stabilizer can be included in the recipe in an amount up to about 5 parts by weight per 100 parts by weight of the polymer. Conventional compounding procedures are followed with the cure temperature usually ranging from about 250 to 325° F. and the cure period from about 15 minutes to 1 hour. It is also within the scope of the invention to postcure the compounded polymer by heating it at a temperature ranging from about 325 to 450° F. for from about 12 to 24 hours.

A more comprehensive understanding of the invention can be obtained by referring to the following illustrative examples which are not intended, however, to be unduly limitative of the invention.

EXAMPLE I

Runs were conducted in which vinyl-substituted arylenedisilanols were prepared as described below.

(1) Preparation of p-phenylenebis(methylvinylsilanol)

(a) Diethoxymethylvinylsilane: A solution of 69 g. (1.50 moles) of ethanol and 119 g. (1.42 moles) of pyridine was added dropwise to a stirred solution of 100 g. (0.71 mole) of dichloromethylvinylsilane in 500 ml. of petroleum ether (B.P. 35–60° C.). During the addition, which required 1.5 hours, the temperature of the mixture was maintained between 15–20° C. with an ice bath. After the mixture was stored overnight at room temperature, the pyridine hydrochloride salt, 168.9 g. (calcd., 165.0), was filtered off and the filtrate was concentrated on a rotary evaporator at 30° C. Vacuum distillation afforded 76.1 g. (67%) of diethoxymethylvinylsilane, B.P. 132° C., $n_D^{20}$ 1.4006.

(b) p-Phenylenebis(ethoxymethylvinylsilane): A solution of 50 g. (0.21 mole) of p-dibromobenzene in 110 ml. of dry tetrahydrofuran was added in rapid drops to 10.5 g. (0.24 g.-atom) of previously activated magnesium covered with 20 ml. of tetrahydrofuran. The reaction proceeded exothermally until the addition of the p-dibromobenzene solution was complete. The mixture was then refluxed for 2 hours, treated with 69 g. (0.43 mole) of diethoxymethylvinylsilane, and again refluxed for 2 hours. After the mixture was cooled to room temperature, filtered, and the solvent distilled on a rotary evaporator, the semi-solid residue was exhaustively extracted with petroleum ether (B.P. 69–90° C.). The combined extracts, concentrated on a rotary evaporator, were vacuum distilled and 31.1 g. (48%) of p-phenylenebis(ethoxymethylvinylsilane) was obtained, B.P. 140° C. (2.0 mm.), $n_D^{20}$ 1.4962.

*Analysis.*—Calcd. for $C_{16}H_{26}O_2Si_2$ (percent): C, 62.68; H, 8.55; Si, 18.33. Found (percent): C, 62.85; H, 8.09; Si, 18.36.

(c) p-Phenylenebis(methylvinylsilanol): A solution of 23.5 g. (0.077 mole) of p-phenylenebis(ethoxymethylvinylsilane) in 23 ml. of 95% ethanol was treated sequentially with 15.5 g. (0.39 mole) of sodium hydroxide in 54.0 ml. of methanol and 5.0 ml. of water and a solution of 15.5 g. of (0.39 mole) of sodium hydroxide in 59.0 ml. of water. After 1 hour, the solution was added dropwise to a vigorously stirred mixture of 308 g. of ice, 308 ml. of water, and 80.0 g. (0.59 mole) of monobasic potassium phosphate. After the mixture was slowly warmed to room temperature, the precipitated solids were filtered off, washed with water, air dried for one day, and vacuum dried for 2 hours at 48° C. Recrystallization of this material from 120 ml. of toluene gave 15.4 g. (80%) of p-phenylenebis(methylvinylsilanol), M.P. 91–93° C. (d.t.a.), 96–97° C. (capillary); NMR peaks (DMSO) at τ9.57 (6H, singlet $SiCH_3$), τ3.87 (6H, multiplet, $SiCH=CH_2$)

τ3.56 (singlet, SiOH), and τ2.39 (4H, singlet, $SiC_6H_5$).

*Analysis.*—Calcd. for $C_{12}H_{18}O_2Si_2$ (percent): C, 57.55; H, 7.24; Si, 22.43. Found (percent): C, 57.50; H, 7.26; Si, 22.31.

(2) Preparation of oxydi-p-phenylenebis (methylvinylsilanol)

(a) Bis(p-ethoxymethylvinylsilylphenyl) ether: A solution of 69.0 g. (0.21 mole) of bis(p-bromophenyl) ether in 110 ml. of dry tetrahydrofuran was added in rapid drops to 10.5 g. (0.24 g.-atom) of previously activated magnesium covered with 20 ml. of tetrahydrofuran. The reaction proceeded exothermally until the addition of the bis(p-bromophenyl) ether solution was complete. The mixture was refluxed for 2 hours, treated with 69.0 g. (0.43 mole) of diethoxymethylvinylsilane, and again refluxed for 2 hours. After the mixture was cooled to room temperature, filtered, and the solvent distilled on a rotary evaporator, the semi-solid residue was exhaustively extracted with petroleum ether (B.P. 60–90° C.). The combined extracts, concentrated on a rotary evaporator, were vacuum distilled to give 29.3 g. (35%) of bis(p-ethoxymethylvinylsilylphenyl) ether, B.P. 192–194° C. (0.05 mm.); $n_D^{20}$ 1.5320.

*Analysis.*—Calcd. for $C_{22}H_{30}O_3Si_2$ (percent): C, 66.28; H, 7.59; Si, 14.09. Found (percent): C, 65.78; H, 7.29; Si, 14.59.

(b) Oxydi-p-phenylenebis(methylvinylsilanol): A solution of 29.3 g. (0.0740 mole) of bis(p-ethoxymethylvinylsilylphenyl) ether in 25.0 ml. of 95% ethanol was added to a stirred solution of 15.4 g. (0.385 mole) of sodium hydroxide in 54.0 ml. of methanol and 5.0 ml. of water. To this mixture was added a solution of 15.4 g. (0.383 mole) of sodium hydroxide in 59.0 ml. of water. After 1 hour, the solution was added dropwise to a vigorously stirred mixture of 300 g. of ice, 300 ml. of water, and 80.0 g. (0.590 mole) of monobasic potassium phosphate. The mixture was slowly warmed to room temperature, the oily product separated by decantation, and dissolved in 55 ml. of petroleum ether (B.P. 60–90° C.) and 83 ml. of toluene. After storage at 0–4° C. for several days the solvent was removed on a rotary evaporator to give 26.3 g. of a viscous oil. All attempts to crystallize the product failed. After the material was stored, first over pentane then over petroleum ether (B.P. 60–90° F.) the infrared spectrum and the NMR spectrum [peaks (DMSO) at τ9.52 (6H, singlet, $SiCH_3$), τ3.82 (tH, multiplet, $SiCH=CH_2$), τ3.52 (singlet, SiOH), τ2.90 (4H, doublet, $C_6H_5$), and τ2.33 (4H, doublet, $SiC_6H_5$)] were consistent with the structure.

*Analysis.*—Calcd. for $C_{18}H_{22}O_3Si_2$ (percent): C, 63.11; H, 6.48; Si, 16.40. Found (percent): C, 63.12; H, 6.17; Si, 16.93.

EXAMPLE II

A run was conducted in which a polymer was prepared in accordance with the method of this invention. In this run (Run 1) a solution of 6.0000 g. (0.01482 mol) of N,N' - bis[(diethylamino)dimethylsilyl]tetramethylcyclodisilazane, 4.6248 g. (0.01452 mol) of oxydi-p-phenylenebis(dimethylsilanol), and 0.0751 (0.00030 mol) of p-phenylenebis(methylvinylsilanol) in 60 ml. of toluene was stirred for 2 hours at room temperature on a steam bath. The solution was stored for 7 days, the solvent was removed in a rotary evaporator, and the residue was heated under a vacuum at 100° C. for 2 hours in a Wood's metal bath. After cooling, the polymer was dissolved in 45 ml. of toluene and treated with 15 ml. of a 0.01 g./ml. solution of bis(trimethylsilyl)acetamide. The mixture was heated for 2 hours on a steam bath under nitrogen. After evaporation of the solvent, the polymer was heated for 2 hours under a vacuum on a Wood's metal bath. The polymer had an inherent viscosity in toluene of 0.36 dl./g.

Another run (Run 2) was carried out in essentially the same manner as described in the preceding paragraph except that p-phenylenebis(methylvinylsilanol) was not included in the reaction mixture. The polymer had an inherent viscosity in toluene of 0.74 dl./g.

The polymers obtained in Runs 1 and 2 were compounded in accordance with the following recipe:

| Component: | Parts by weight |
|---|---|
| Polymer | 100 |
| Silica [1] | 40 |
| t-Butyl peroxybenzoate | 1.7 |

[1] Hi Sil 233.

After milling the compounded polymers were heated in a mold at 300° F. for 30 minutes. The results of the runs are shown in Table I.

TABLE I

| Run number: | Polymer inherent viscosity | Results |
|---|---|---|
| 1 | 0.36 | Cured. |
| 2 | 0.74 | No cure. |

The foregoing runs demonstrate that the polymer of Run 1, which was prepared in the presence of a vinyl-substituted arylenedisilanol, could be cured. However, when the compound containing vinyl groups was not included in the reaction mixture as in Run 2, the polymer could not be cured.

EXAMPLE III

A series of runs was conducted in which various monomers were used to prepare polymers in accordance with the method of this invention. The procedure followed in each run was to heat a mixture of the monomers in a Wood's metal bath. After the polymer was cooled, it was mixed overnight with toluene (about 1 liter/10 g. of polymer), and the insoluble portion, if any was filtered off, dried, and weighed. The solution was stirred with 100 ml. portions of water, and the water phases were separated until the extracts were neutral. After the solvent was evaporated at 50° C. in a rotary evaporator, the inherent viscosity and yield were determined. The monomers, the amounts thereof, the polymerization conditions as well as the inherent viscosity and yield determinations are shown hereinafter in Table II.

The data in Table III show that the polymers prepared by the method of this invention can be readily cured with

TABLE II

| Run number | A, g./mol | B, g./mol | C, g./mol | D, g./mol | E, g./mol | F, g./mol | Pheno-thiazine, g./percent | Polymerization conditions, °C./hr. | Inherent viscosity, dl./g. | Yield, percent |
|---|---|---|---|---|---|---|---|---|---|---|
| 3 | | 7.1919 0.02323 | | 6.7588 0.02122 | | 0.2214 0.000884 | (1) | 0.0131 0.1 | 160 4 | 2.69 | 94 |
| 4 | | | 5.5889 0.02372 | 6.9117 0.02170 | | 0.02264 0.000904 | (1) | 0.0118 0.1 | 160 4 | 2.86 | 93 |
| 5 | 0.6292 0.00195 | | | 0.0887 0.003418 | | 0.0744 0.0002972 | (2) | 0.0016 0.1 | 140 4 | | |
| 6 | 5.0350 0.01560 | | | 8.7081 0.027 | | 0.5955 0.002378 | (2) | 0.0132 0.1 | 140 4 | 1.82 | 88 |
| 7 | 6.2683 0.01943 | | | 11.3135 0.03552 | | 0.3706 0.001480 | (1) | 0.0165 0.1 | 140 4 | 1.03 | 84 |
| 8 | 9.4871 (0.02940) | | | | 12.1723 0.5376 | 0.5610 0.002240 | (1) | 0.0200 0.1 | 140 4 | 0.54 | 98 |

[1] 4 mol percent.
[2] 8 mol percent.

NOTE.—A=Decamethyl-1,5-dioxa-3,7-diaza-2,4,6,8-tetrasilacyclooctane (5% excess); B=Nonamethyl-1,3,5-trioxa-7-aza-2,4,6,8 tetrasilacyclooctane (5% excess); C=Heptamethyl-1,3-dioxa-5-aza-2,4,6-trisilacyclohexane (5% excess); D=Oxydi-p-phenylenebis -(dimethylsilanol); E=p-Phenylenebis (dimethylsilanol); F=p-Phenylenebis(methylvinylsilanol).

EXAMPLE IV

A series of runs was conducted in which certain of the polymers prepared as described in Example III were compounded after which physical properties of the compounded elastomers were determined. Each polymer was milled in the proportion of 100 parts of polymer, 40 parts of silica (HiSil 233), 1.7 parts of t-butyl peroxybenzoate, and optionally with ferric oxide stabilizer. Each compounded polymer was press cured at 300° F. for 30 minutes and post cured at 400° F. for 20 hours in a forced air oven after being heated to 400° F. in 50° F. increments over a 7 hour period. Ultimate tensile strengths, percent elongations, and 50 percent moduli were determined on an Instron Tensile Tester. The cured elastomers were also heated in a bomb at 250° C. for 24 hours after which the aforementioned physical properties were determined. Furthermore, a control run was carried out in which a commercial vinyl-substituted silicone was cured and tested as were the polymers prepared by the method of this invention. The results of the tests are set forth hereinafter in Table III.

an organic peroxide catalyst. Otherwise, it would not have been possible to determine their physical properties. Also, the data demonstrate that the compounded polymers are resistant to reversion when heated for an extended period of time whereas a commercial vinyl-substituted silicone decomposed under similar conditions.

EXAMPLE V

Two runs were carried out in which two of the polymers prepared as described in Example IIII were compounded and cured as in Example IV. Physical properties and weight loss of each cured elastomer were determined after 100, 300 and 500 hours at 500° F. in a circulating air oven as well as under other conditions as shown hereinafter in Table IV in which the results of the tests are recorded.

TABLE IV

| Run number | Polymer from Example III, inherent viscosity (dl./g.) | Conditions | Tensile (p.s.i.) | | Elongation (percent) | | 50% modulus (p.s.i.) | | Weight loss (percent) |
|---|---|---|---|---|---|---|---|---|---|
| 16 | Run 7, 1.03 | Cured normally | 705 | [1](3) | 174 | (3) | 356 | (3) | |
| | | After 100 hr. at 500° F | 532 | (3) | 50.0 | (3) | 214 | (3) | 4.4 |
| | | After 300 hr. at 500° F | 257 | (3) | 24.1 | (3) | 124 | (3) | 8.8 |
| | | After 500 hr. at 500° F | 407 | (3) | 16.9 | (3) | 219 | (3) | 12.1 |
| | | After 500 hr. in vented container with water at 65-95° C. | 314 | (3) | 78.3 | (3) | 154 | (3) | |
| 17 | Run 8, 0.54 | Cured normally | 549 | (3) | 44.2 | (3) | 267 | (3) | |
| | | After 100 hr. at 500° F | 532 | (3) | 50.0 | (3) | 214 | (3) | 3.6 |
| | | After 300 hr. at 500° F | 459 | (3) | 24.5 | (3) | 229 | (2) | 6.5 |
| | | After 500 hr. at 500° F | 428 | (3( | 16.7 | (3) | 223 | (3) | 8.5 |
| | | After 500 hr. in vented contaier with water at 65-95° C. | 349 | (3) | 37.9 | (3) | 173 | (3) | |
| | | After 24 hr. in a closed container at 250° C. | 393 | (3) | 51.8 | (3) | 176 | (3) | |

[1] Number of replications used in average.

The data in Table IV demonstrate that the cured polymers prepared by the method of this invention are thermally stable when heated at elevated temperatures under oxidation conditions.

TABLE III

| | | | Cured polymer | | | | | | Samples heated 24 hrs. at 250° C. in a bomb | | | | | |
|---|---|---|---|---|---|---|---|---|---|---|---|---|---|---|
| Run number | Polymer from Example III, inherent viscosity (dl./g.) | Mapico red (parts)[1] | Tensile (p.s.i.) | | Elongation (percent) | | 50% modulus (p.s.i.) | | Tensile (p.s.i.) | | Elongation (percent) | | 50%00 modulus (p.s.i.) | |
| 9 | Run 3, 2.69 | 0 | 609 | [2](3) | 84.1 | (3) | 392 | (3) | 87.8 | (3) | 117 | (2) | 52.2 | (2) |
| 10 | | 3 | 604 | (3) | 89.7 | (3) | 371 | (3) | 86.2 | (3) | 142 | (2) | 40.8 | (2) |
| 11 | Run 4, 2.86 | 0 | 664 | (3) | 88.2 | (3) | 430 | (3) | 99.1 | (2) | 83.7 | (2) | 60.3 | (2) |
| 12 | | 3 | 654 | (3) | 72.9 | (3) | 401 | (3) | 112 | (3) | 104 | (3) | 64.3 | (3) |
| 13 | Run 6, 1.82 | 0 | 685 | (2) | 60.6 | (2) | 266 | (3) | 217 | (3) | 72.5 | (3) | 85.8 | (3) |
| 14 | | 3 | 423 | (3) | 40.2 | (3) | 183 | (3) | 334 | (3) | 75.5 | (3) | 84.3 | (3) |
| 15 | Commercial vinyl-substituted silicone. | 0 | 1,126 | (3) | 657 | (3) | 590 | (3) | Samples lost integrity | | | | | |

[1] Ferric oxide stabilizer.
[2] Number of replications used in average.

EXAMPLE VI

A series of runs was conducted in which the polymer prepared in Run 1 of Example II was compounded in accordance with the following recipe:

| Component: | Parts by weight |
|---|---|
| Polymer | 100 |
| Silica | 40 |
| t-Butyl peroxybenzoate | Varied |

After milling the compounded polymers were heated in a mold at 300° F. for 30 minutes. Physical properties of the cured elastomers were then determined. The results of the tests and the amount of curing agent used are shown below in Table V.

TABLE V

| Run number | Curing agent, parts | Tensile, p.s.i. | Elongation, p.s.i. | 50% modulus, p.s.i. |
|---|---|---|---|---|
| 18 | 0 | No cure | | |
| 19 | 0.6 | 73 | [1] (3) | 23 | 38 |
| 20 | 1.7 | 134 | (3) | 31 | 62 |
| 21 | 3.0 | 130 | (3) | 35 | 66 |

[1] Number of replications used in the average.

The data in Table V show that no cure was obtained in the absence of a curing agent. The cure with 0.6 part of the curing agent provided a cured elastomer that was weak while the cure with 3.0 parts gave a product that contained bubbles. On the other hand, use of 1.7 parts of catalyst gave a satisfactory product.

EXAMPLE VII

A series of runs is carried out in which polymers are prepared in accordance with the procedure described in Example III. The same cyclic siloxazanes and the same disilanols are used, but the vinyl-substituted disilanol employed is oxydi-p-phenylenebis(methylvinylsilanol). Polymer products are obtained that can be cured with organic peroxide catalysts.

Modification of the present invention may be made by those skilled in the art in view of the foregoing disclosure. Any such modifications clearly fall within the spirit and scope of the invention.

We claim:

1. A method for producing modified siloxane and siloxazane polymers which comprises the step of reacting, at a temperature in the range of about 20 to 200° C. for a period ranging from about 2 to 10 hours, a mixture of:

(1) a disilanol having the formula:

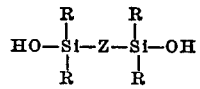

(2) a silicon compound selected from the group of compounds having the following formulae:

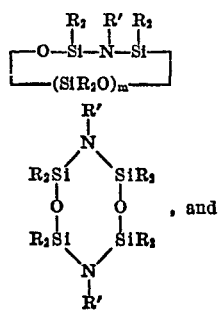

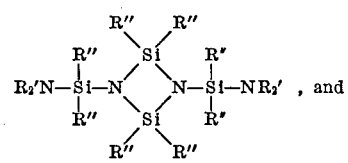

(3) a vinyl-substituted compound having the formula:

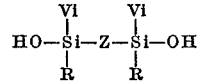

wherein Z is an arylene group, R is a monovalent hydrocarbon radical, m is 1 or 2, R' is hydrogen or an alkyl radical, R" is individually selected from the group consisting of alkyl radicals and aromatic radicals having 6 carbon atoms in the aromatic ring, and Vi is vinyl.

2. The method according to claim 1 in which about stoichiometric amounts of the disilanol and the silicon compound, and the vinyl-substituted compound in the amount of about 1 to 50 mol percent of the disilanol are reacted.

3. The method according to claim 2 in which about 5 to 10 percent in excess of the stoichiometric amount of the silicon compound is used and the amount of the vinyl-substituted compound is about 1 to 10 mol percent of the disilanol.

4. The method according to claim 3 in which the mixture is reacted at a temperature in the range of about 140 to 180° C. for a period of about 2 to 10 hours.

5. The method according to claim 4 in which the reaction is conducted in a medium which is a solvent for the polymer product.

6. The method according to claim 5 in which the solvent is toluene or xylenes.

7. The method according to claim 5 in which a mixture of p-phenylenebis(dimethylsilanol), decamethyl-1,5-diaza-3,7-dioxa-2,4,6,8-tetrasilacyclooctane, and p-phenylenebis(methylvinylsilanol) is reacted.

8. The method according to claim 5 in which a mixture of oxydi-p-phenylenebis(dimethylsilanol), nonamethyl-1,3,5-trioxa-7-aza-2,4,6,8-tetrasilacyclooctane, and p-phenylenebis(methylvinylsilanol) is reacted.

9. The method according to claim 5 in which a mixture of p-phenylenebis(dimethylsilanol), heptamethyl-1,3-dioxa-5-aza-2,4,6-trisilacyclohexane, and p-phenylenebis(methylvinylsilanol) is reacted.

10. The method according to claim 5 in which a mixture of oxydi-p-phenylenebis(dimethylsilanol), heptamethyl-1,3-dioxa-5-aza-2,4,6-trisilacyclohexane, and oxydi-p-phenylenebis(methylvinylsilanol) is reacted.

11. The method according to claim 5 in which a mixture of oxydi-p-phenylenebis(dimethylsilanol), N,N'-bis[(diethylamino)dimethylsilyl]tetramethylcyclodisilazane, and p-phenylenebis(methylvinylsilanol) is reacted.

12. The method according to claim 5 in which a polymer product is recovered and cured by heating same in the presence of an organic peroxide catalyst at a temperature ranging from about 250 to 325° F. for a period of about 15 minutes to 1 hour.

13. A polymer prepared by the method of claim 5.

14. A cured polymer prepared by the method of claim 12.

References Cited

UNITED STATES PATENTS 3,702,317   11/1972   Breed et al.   260—46.5 P

DONALD E. CZAJA, Primary Examiner

M. I. MARQUIS, Assistant Examiner

U.S. Cl. X.R.

260—45.75 R, 46.5 UA, 46.5 G, 46.5 P